United States Patent
Bolotov et al.

(10) Patent No.: US 8,654,969 B2
(45) Date of Patent: Feb. 18, 2014

(54) CIPHER INDEPENDENT INTERFACE FOR CRYPTOGRAPHIC HARDWARE SERVICE

(75) Inventors: Anatoli Bolotov, Cupertino, CA (US); Mikhail Grinchuk, San Jose, CA (US); Lav Ivanovic, Sunnyvale, CA (US); Christine E. Severns-Williams, Deephaven, MN (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 12/673,022

(22) PCT Filed: Apr. 10, 2009

(86) PCT No.: PCT/US2009/040154
§ 371 (c)(1),
(2), (4) Date: Feb. 11, 2010

(87) PCT Pub. No.: WO2010/098778
PCT Pub. Date: Sep. 2, 2010

(65) Prior Publication Data
US 2012/0121079 A1   May 17, 2012

Related U.S. Application Data (60) Provisional application No. 61/155,864, filed on Feb. 26, 2009.

(51) Int. Cl.
*H04K 1/00*       (2006.01)
*G06F 11/30*      (2006.01)

(52) U.S. Cl.
USPC ............................................ 380/28; 713/189

(58) Field of Classification Search
USPC ............ 380/28, 255, 263, 268, 277; 713/189, 713/191
See application file for complete search history.

(56) References Cited

U.S. PATENT DOCUMENTS

| | | | |
|---|---|---|---|
| 5,796,836 A | 8/1998 | Markham | |
| 6,983,366 B1* | 1/2006 | Huynh et al. | 713/168 |
| 7,590,869 B2* | 9/2009 | Hashimoto | 713/194 |
| 7,697,681 B2* | 4/2010 | Leech | 380/28 |
| 7,779,272 B2* | 8/2010 | Lee | 713/189 |
| 8,190,553 B2* | 5/2012 | Routt | 706/62 |
| 2002/0048364 A1* | 4/2002 | Gligor et al. | 380/37 |
| 2002/0191793 A1 | 12/2002 | Anand et al. | |
| 2004/0039928 A1 | 2/2004 | Elbe et al. | |
| 2004/0091104 A1* | 5/2004 | Kawamura et al. | 380/28 |
| 2005/0147239 A1* | 7/2005 | Chin et al. | 380/28 |
| 2006/0056623 A1* | 3/2006 | Gligor et al. | 380/28 |
| 2007/0177677 A1 | 8/2007 | Thomsen | |
| 2008/0049930 A1* | 2/2008 | You et al. | 380/28 |
| 2008/0235519 A1* | 9/2008 | Onouchi et al. | 713/189 |
| 2009/0138710 A1* | 5/2009 | Minematsu | 713/170 |

* cited by examiner

OTHER PUBLICATIONS

Coron et al. Universal Padding Schemens for RSA. 2002. vol. 2442. pp. 226-241.*

*Primary Examiner* — Nathan Flynn
*Assistant Examiner* — Abdullah Almamun
(74) *Attorney, Agent, or Firm* — Alexander J. Neudeck; Cochran Freund & Young LLC (57) ABSTRACT

Disclosed is a cipher independent cryptographic hardware service. Cipher independent transactions are received into input slots (202). The input slots contain FIFOs to hold the transactions. The transactions are converted from cipher independent form to cipher dependent form (206) and timing as they are removed from the FIFOs. After cryptographic processing by cipher specific hardware, the results are sent to output FIFOs (212). Multiple FIFOs and cryptographic hardware may be used so that multiple cryptographic functions may be performed in parallel and simultaneously.

13 Claims, 6 Drawing Sheets

CIPHER INDEPENDENT INTERFACE FOR CRYPTOGRAPHIC HARDWARE SERVICE

CROSS-REFERENCE TO RELATED APPLICATION

This application is based upon and claims the benefit of U.S. provisional application No. 61/155,864, entitled "Cipher Independent Interface for Cryptographic Hardware Service," filed Feb. 26, 2009, the entire disclosure of which is herein specifically incorporated by reference for all that it discloses and teaches.

BACKGROUND OF THE INVENTION

Modern application-specific integrated circuits (ASICs) integrate greater and greater functionality. These so-called system-on-a-chip integrate many components of a computer or other electronic system into a single integrated circuit. One advantage of system-on-a-chip designs is that they usually consume less power and have a lower cost than the multichip systems they replace. Furthermore, systems-on-a-chip help reduce overall system production cost because there are fewer packages in a given system.

Some of the functions integrated into systems-on-a-chip include graphics, Ethernet media access control layer (MAC), Universal serial bus (USB), memory controllers, and other application-specific logic. Another compute intensive function that may be incorporated into an ASIC are hardware cryptographic function blocks. Cryptography modules become more and more ubiquitous in modern ASICs for various applications.

Typically, these cryptographic modules supports different standards. They also typically use different interfaces. In particular, these cryptographic modules often also require very specific and precise timing schedule for input/output information.

SUMMARY OF THE INVENTION

An embodiment of the invention may therefore comprise a cryptographic hardware system, comprising: a plurality of input slots that receive cipher independent cryptographic transactions; a first wrapped cipher block that includes first cipher hardware that receives cipher independent cryptographic transactions and sends first cipher dependent transactions to said first cipher hardware, the first wrapped cipher block translating said cipher independent cryptographic transactions to said first cipher dependent transactions and translates first cipher dependent result transactions received from said first cipher hardware to cipher independent result transactions; and, a first output FIFO having a plurality of slots that receive said cipher independent result transactions associated with said first wrapped cipher block.

An embodiment of the invention may therefore further comprise a method of providing cryptographic services, comprising: receiving cipher independent cryptographic transactions; receiving said cipher independent cryptographic transactions into a first wrapped cipher block that includes first cipher hardware; translating said cipher independent cryptographic transactions to first cipher dependent transactions; sending first cipher dependent transactions to said first cipher hardware; translating first cipher dependent result transactions received from said first cipher hardware to cipher independent result transactions; and, receiving said cipher independent result transactions into a first output FIFO.

DETAILED DESCRIPTION OF THE EMBODIMENTS

Figure 1:
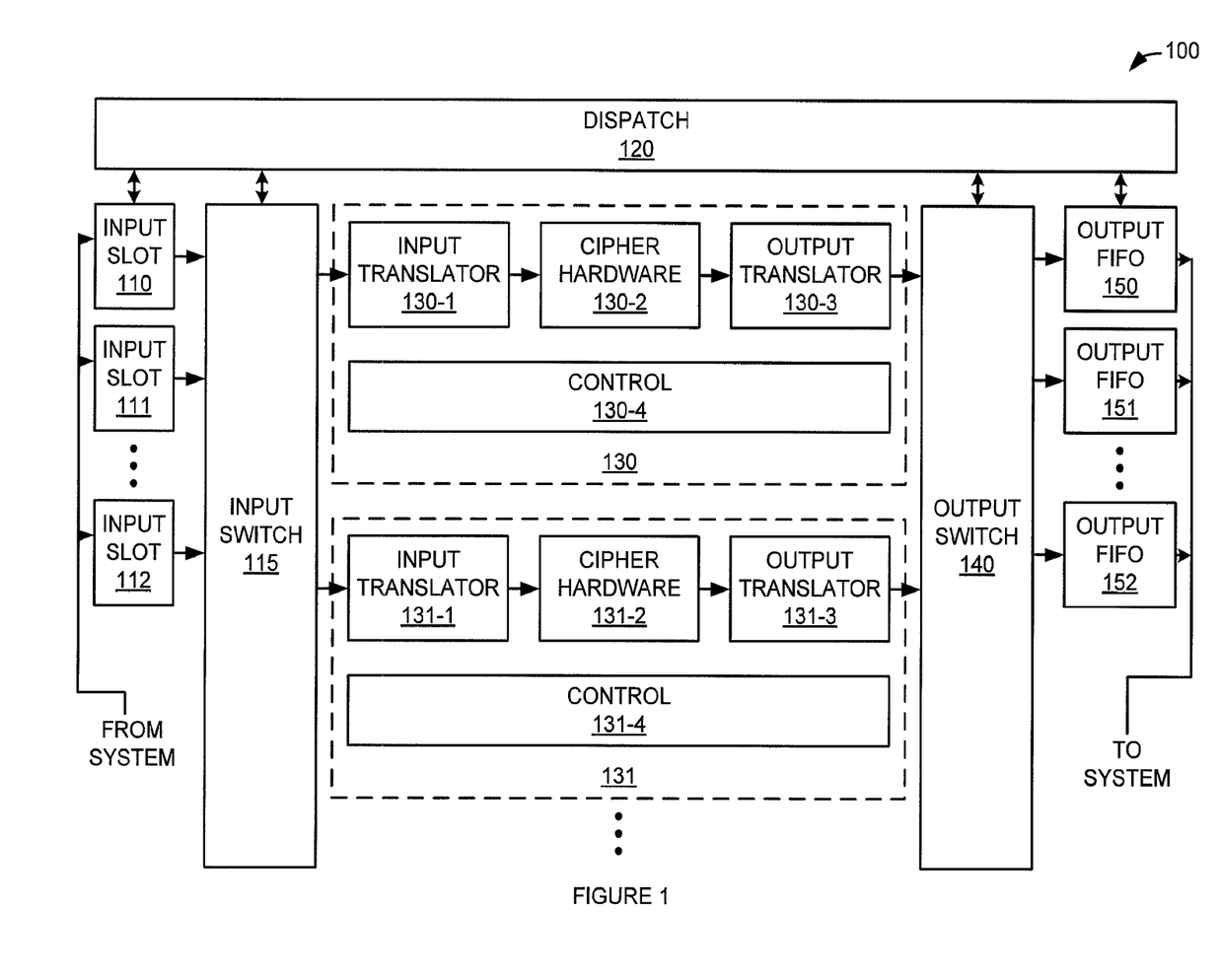
FIG. 1 is a block diagram of a cryptographic hardware system.

FIG. 1 is a block diagram of a cryptographic hardware system. Cryptographic hardware 100 comprises input slot 110, input slot 111, input slot 112, input switch 115, dispatch 120, wrapped cipher block 130, wrapped cipher block 131, output switch 140, output FIFO 150, output FIFO 151, and output FIFO 152. Wrapped cipher block 130 includes input translator 130-1, cipher hardware 130-2, output translator 130-3, and control 130-4. Wrapped cipher block 131 includes input translator 131-1, cipher hardware 131-2, output translator 131-3, and control 131-4. Each of the elements of cryptographic hardware 100 operatively coupled to each of the other elements of cryptographic hardware 100.

As shown in FIG. 1, input slots 110-112 are operatively coupled to a system for receiving commands and data. Input slots 110-112 are operatively coupled to dispatch 120. Input slots 110-112 are operatively coupled to input switch 115. Input switch 115 is operatively coupled to dispatch 120. Input switch 115 is operatively coupled to wrapped cipher block 130 and wrapped cipher block 131. In particular, input switch 115 is operatively coupled input translator 130-1 and input translator 131-1. Thus, cryptographic transactions placed in input slots 110-112 may be routed to wrapped cipher block 130, wrapped cipher block 131, or additional wrapped cipher blocks (not shown). In an embodiment, input switch 115 may be a crosspoint switch or other N×M port routing device, where N is a number of input ports and M is a number of output ports. N would typically correspond to the number of inputs slots 110-112. M would typically correspond to the number of wrapped cipher blocks 130-131.

Output FIFO's 150-152 are operatively coupled to a system for sending results and/or other messages. Output FIFO's 150-152 are operatively coupled to output switch 140. Output FIFO's 150-152 are operatively coupled to dispatch 120. Output switch 140 is operatively coupled to dispatch 120. Wrapped cipher blocks 130-131 are operatively coupled to output switch 140. In particular, output switch 140 operatively coupled to output translator 130-3 and output translator 131-3. Thus, cryptographic result transactions produced by wrapped cipher block 130-131 may be routed to any of output FIFO's 150-152. In an embodiment, output switch 140 may be a crosspoint switch or other M×Q port routing device, where M is a number of input ports and Q is a number of output ports. M would typically correspond to the number of wrapped cipher blocks 130-131. Q would typically correspond to the number of output FIFOs 150-152.

Input translator 130-1 is operatively coupled to cipher hardware 130-2. Cipher hardware 130-2 is operatively coupled to output translator 130-3. Input translator 130-1, cipher hardware 130-2, and output translator 130-3 all are operatively coupled to control 130-4. Thus, control 130-4 may manage the operation and data input and output of input translator 130-1, cipher hardware 130-2, and output translator 130-3. Control 130-4 and input translator 130-1 may cooperate to sends cipher dependent transactions to cipher hardware 130-2 using cipher dependent timing. In other words, control 130-4 and input translator 130-1 may cooperate to send data and control signals to cipher hardware 130-2 in a form, and with the timing, required by cipher hardware 130-2.

Input translator 131-1 is operatively coupled to cipher hardware 131-2. Cipher hardware 131-2 is operatively coupled to output translator 131-3. Input translator 131-1, cipher hardware 131-2, and output translator 131-3 all are operatively coupled to control 131-4. Thus, control 131-4 may manage the operation and data input and output of input translator 131-1, cipher hardware 131-2, and output translator 131-3. Control 131-4 and input translator 131-1 may cooperate to sends cipher dependent transactions to cipher hardware 131-2 using cipher dependent timing. In other words, control 131-4 and input translator 131-1 may cooperate to send data and control signals to cipher hardware 131-2 in a form, and with the timing, required by cipher hardware 131-2.

In an embodiment, input slots 110-112 may contain input FIFO's. These input FIFO's may receive cipher independent cryptographic transactions from a system. In addition, input slots 110-112 may receive and/or compute a priority for not yet started cryptographic transactions. Because there are a plurality of input slots 110-112, multiple wrapped cipher blocks 130-131 may be accessed in parallel and independently. The number of multiple transactions that may be performed in parallel and independently is limited by the number of FIFO's in input slots 110-112 and the number of wrapped cipher blocks 130-131. Thus, wrapped cipher block 130 may be receiving and processing cipher independent cryptographic transactions from input slot 110 at the same time wrapped cipher block 131 is receiving and processing cipher independent cryptographic transactions from input slot 112.

Dispatch 120 may know which wrapped cipher blocks 130-131 and which output FIFO's 150-152 are in use. Dispatch 120 may know the correspondence between input slots 110-112, wrapped cipher blocks 130-131, and output FIFO's 150-152. Thus, dispatch 120 may control input switch 115 and output switch 140. Dispatch 120 may observe input slots 110-112 to choose cryptographic transactions to start and also allocate output FIFO's 150-152 to receive cryptographic result transactions.

Input switch 115 provides connections between input slots 110-112 and wrapped cipher block 130-131. Input switch 115 may also receive status signals from the wrapped cipher blocks 130-131. For example, input switch 115 may receive transaction complete indicators from control 130-4 and control 131-4. In response, input switch 115 may send indicators to dispatch 120 that an input slots 110-112 may be reused.

Wrapped cipher blocks 130-131 may be developed individually for each particular cipher hardware 130-2 and 131-2. Wrapped cipher blocks 130-131 provide a uniform data and signal interface. This uniform data and signal interface may comprise standard FIFO-like interfaces on both input and output. The standard interfaces allow cipher independent cryptographic transactions to be placed in input slots 110-112, and routed to wrapped cipher blocks 130-131, independent of the underlying cipher hardware 130-2 and 131-2 that determine the cipher function (i.e., cryptographic code) performed by wrapped cipher block 130-131.

In an embodiment, the underlying cipher hardware 130-2 and 131-2 may implement different ciphers or the same cipher. In addition, cipher hardware 130-2 and 131-2 may have different timing requirements. However, the FIFO's in input slots 110-112, and output FIFO's 150-152, allow cipher independent cryptographic transactions and cipher independent result transactions to be written to, and read from, input slots 110-112 and output FIFO's 150-152, respectively, independent of the input and timing requirements of cipher hardware 130-2 in 131-2.

Control 130-4 and 131-4 control cipher hardware 130-2 in 131-2, respectively. Control 130-4 and 131-4 also control input translator is 130-1 in 131-1 to process cipher independent cryptographic transactions into a form and timing that cipher hardware 130-2 and 131-2 may understand. Control 130-4 and 131-4 also control output translator is 130-3 in 131-3 to process cipher dependent results received from cipher hardware 130-2 and 131-2 into a cipher independent form and timing that output FIFO is 150-152 and the rest of the system may understand.

Input switch 140 provides connections between output FIFO's 150-152 and wrapped cipher blocks 130-131. Output FIFO's 150-152 accept cipher independent result transactions from wrapped cipher blocks 130-131 via output switch 140. Output FIFO's 150-152 may also provide an indication that they are full or nearly full. This indication may be relayed by output switch 142 to wrapped cipher blocks 130-131. This indication may stop cipher hardware 130-2 and 131-2 from running. By stopping cipher hardware 130-2 in 131-2 output FIFO's 150-152 are prevented from overflowing.

The aforementioned cryptographic hardware 100 provides multiple I/O channels that can run multiple cryptographic transactions concurrently. By using FIFO-based input slots 110-112 which receive cipher independent cryptographic transactions, detailed time scheduling and data formatting is not necessary. The cipher independent cryptographic transactions provide a uniform interface for all ciphers and cipher hardware 130-2 and 131-2. Thus, while input slot 110 is providing cipher independent cryptographic transactions to wrapped cipher block 130 and the results are being placed in output FIFO 150, input slot 111 may simultaneously be providing cipher independent cryptographic transactions to wrapped cipher block 131 and the results be placed in output FIFO 152. In an embodiment, that uniform interface may comprise 8-bits of control and 64-bits of data.

Cryptographic hardware 100 provides a uniform interface across the set of attached cipher blocks, the parameters of each individual cipher, number of input/output channels, the sizes of the FIFO's, and the topology between ciphers and FIFO's (i.e., dedicated/shared/mixed connections). In addition, the cipher independent cryptographic transactions may be expressed in either binary or mnemonic languages. The proposed architecture and technical solution suppose to be very convenient and flexible, and also easy for integration.

It should be noted that there are only a few such cryptographic modules that provide combined crypto service fully in hardware available in industry. In combination with highly competitive crypto library blocks, cryptographic hardware 100 allows momentum momentum to be gained for growing data protection market wins and security demands for various applications, both existing and planned for development.

The architecture of cryptographic hardware 100 supports of drop-in solution for cipher blocks. Dispatcher 120 is allows flexible multi stream input/output channels for concurrent transaction. Dispatcher 120 supports and handles transaction priorities, deadlock handling, multithreading, and cancelling.

Development of the complex structure of cryptographic hardware 100 may require elaborating of the comprehensive debugging and testing system. Thus, built-in testing, debugging support, error detecting, and error recovering capabilities are provided.

The architecture and hardware implementation of proposed Cryptographic hardware 100 provides multiple and combined crypto service for various hardware and/or firmware applications/protocols. Supported crypto services can be conveniently and easily expressed in a unified Super Language by means of so called Playing cards. Playing cards are essentially convenient templates for the crypto job descriptions.

An example of cipher independent cryptographic transactions that may be used to drive cipher hardware 100 implementing the AES cipher in the Galois Counter mode (GCM) mode is given in Table 1. This is an example of the data that may be received by input translators 130-1 and 131-1. Note that in Table 1, each semicolon (";") indicates a clock cycle. Thus, for example, between the BEGIN_TRANS and first SEND_KEY_0 transaction there is only 1 clock cycle.

TABLE 1

```
// 7e0306 (hex) is a randomly assigned transaction ID
// 17 (hex) means "it's a GCM-AES transaction"
//        (codes are defined/allocated during netlist generation)
// c (hex) means "authenticated encryption"
BEGIN_TRANS ID = 0x7e0306 SCENARIO = 0x17 PARAMETERS =
0xc ;
// 128-bit key requires two 64-bit data blocks;
// the last one is marked as LAST=1
  SEND_KEY_0 DATA = 0xfeffe9928665731c ;
  SEND_KEY_0 DATA = 0x6d6a8f9467308308 LAST = 1 ;
// 96-bit IV also requires two 64-bit data blocks: one full block
// and one partial block (AUX=4 means "its size is 4 bytes")
// CFU/CSE ignores the padding bits (00000001),
// thus they might be randomly set
  SEND_IV_0 DATA = 0xcafebabefacedbad ;
  SEND_IV_0 DATA = 0xdecaf88800000001 LAST = 1 AUX = 4 ;
// opcode SEND_DATA_0 means "AAD"
// 96-bit AAD also requires two 64-bit data blocks: one full block
// and one partial block (AUX=4 means "its size is 4 bytes")
// CFU/CSE ignores the padding bits (f7fe6eaf),
// thus they might be randomly set
  SEND_DATA_0 DATA = 0x0060addad2f34f7d ;
  SEND_DATA_0 DATA = 0x12ef2fddf7fe6eaf LAST = 1 AUX = 4 ;
// opcode SEND_DATA_1 means "payload data"
// 192-bit payload data requires three full 64-bit data blocks
  SEND_DATA_1 DATA = 0x09313225f88406e5 ;
  SEND_DATA_1 DATA = 0xa55909c5aff50000 ;
  SEND_DATA_1 DATA = 0x00c0b16aedf5aa0d LAST = 1 ;
// value 7e0306 (hex) must match one from BEGIN_TRANS
END_TRANS ID = 0x7e0306 ;
```

An example of cipher dependent transactions (in mnemonic form) to drive cipher hardware that implements the AES cipher in the Galois Counter mode (GCM) mode is given in Table 2. This is an example of the data that may be received by cipher hardware 130-2 and 131-2 after the cipher independent cryptographic transactions are translated by input translators 130-1 and 131-1. Note that in Table 2, each semicolon ";" indicates a clock cycle. Thus, for example, between the save_key and first make_mask transaction there are 15 clock cycles. Accordingly, the translation performed by input translators 130-1 and 131-1 operates to translate in both bit format and time. Likewise, output translators 130-3 and 131-3 may operate to translate the outputs of cipher hardware 130-2 and 131-2 in both bit format and time.

TABLE 2

```
SAVE_KEY K_ID 2 KEY_TYPE 1 KEY <~
0xfeffe9928665731c6d6a8f9467308308
;;;;;;;;;;;;;;
MAKE_MASK K_ID 2 T_ID 4 GCM_INIT_H DATA =
0x00112233445566778899aabbccddeeff
;;;;;;;;;;;;
MAKE_MASK K_ID 2 T_ID 4 GCM_LOAD_IV DATA =
0xcafebabefacedbaddecaf88800000001
;;;;;;;;;;;;
MAKE_MASK K_ID 2 T_ID 4 GCM_LOAD_LEN DATA ~
0x000000000000006000000000000000c0
;;;;;;;;;;;;
MAKE_MASK K_ID 2 T_ID 4 GCM_AAD_INCOMPLETE DATA ~
0x0060addad2f34f7d12ef2fddf7fe6eaf ;;;;;;;;;;;;;
ENCRYPT K_ID 2 T_ID 4 GCM_ENC DATA ~
0x09313225f88406e5a55909c5aff50000
;;;;;;;;;;;;
ENCRYPT K_ID 2 T_ID 4 GCM_ENC_INCOMPLETE DATA ~
0x00c0b16aedf5aa0de657ba637b39e21f
;;;;;;;;;;;;
MAKE_MASK K_ID 2 T_ID 4 GCM_TAG_FROM_REG DATA ~
0x0060bbbbbbbbbbbbbbbbbbbbbbbb00c0
;;;;;;;;;;;;
;;;;;;;;;;;;;;;;;
```

Figure 2:
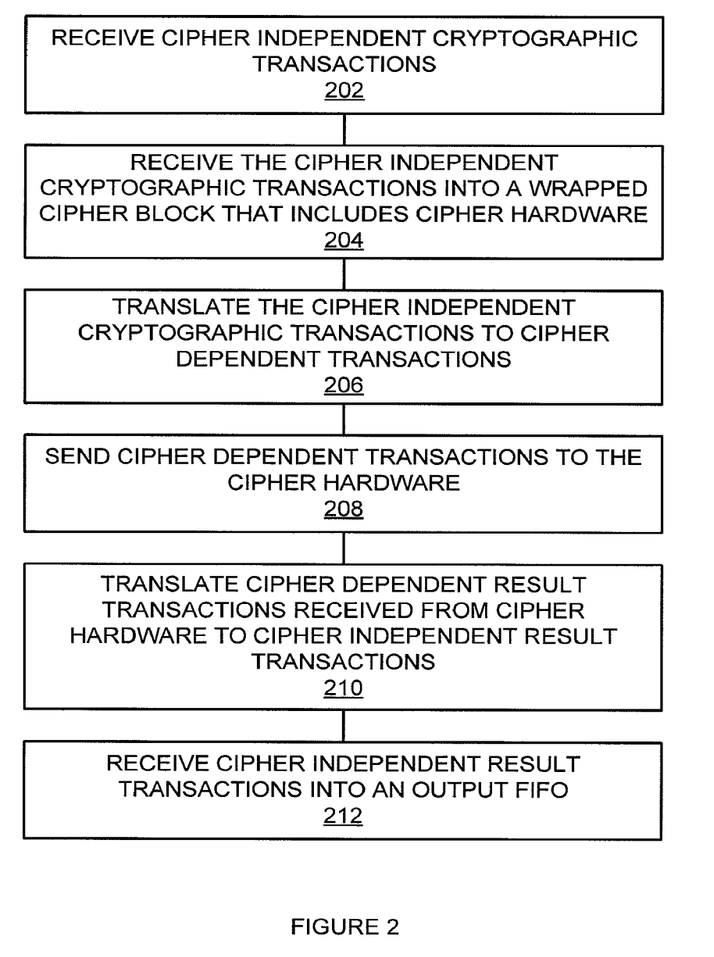
FIG. 2 is a flowchart of a method of providing cryptographic hardware services.

FIG. 2 is a flowchart of a method of providing hardware cryptographic services. The steps shown in FIG. 2 may be performed by one or more elements of cryptographic hardware 100. Cipher independent cryptographic transactions are received (202). For example, input slot 110 may receive cipher independent cryptographic transactions. Input slot 110 may receive the cipher independent cryptographic transactions into a FIFO. The cipher independent cryptographic transactions are received into a wrapped cipher block that includes cipher hardware (204). For example, wrapped cipher block 130 may receive, via input switch 115, cipher independent cryptographic transactions from input slot 110. Wrapped cipher block 130 may include cipher hardware 130-2.

The cipher independent cryptographic transactions are translated to cipher dependent transactions (206). For example, input translator 130-1 make translate cipher independent cryptographic transactions into cipher dependent transactions suitable for cipher hardware 130-2. In an embodiment, this translation from cipher independent cryptographic transactions to cipher dependent cryptographic transactions may include translation of the form, format, bit-ordering, command sequence, and/or timing. In other words, input translator 130-1 implement any foam of state machine or other logic to convert cipher independent cryptographic transactions stored in, and received from, input slot 110 into the appropriate data and control signals to drive cipher hardware 130-2.

Cipher dependent transactions are sent to the cipher hardware (208). For example, cipher dependent transactions from input translator 130-1 and control signals from control 130-4 may be sent to cipher hardware 130-2. These cipher dependent transactions and control signals may cause the cipher hardware to perform its cipher functions. These cipher functions may cause the cipher hardware to produce cipher dependent results. These cipher dependent results may include, or be, cipher dependent result transactions and/or control signals.

Cipher dependent result transactions received from cipher hardware are translated to cipher independent result transactions (210). For example, output translator 130-3 may translate cipher dependent result transactions received from cipher hardware 130-2 into cipher independent result transactions. Cipher independent result transactions are received into an output FIFO (212). For example, output FIFO 150 may receive from output translator 130-3, via output switch 140, cipher independent result transactions.

Figure 3:
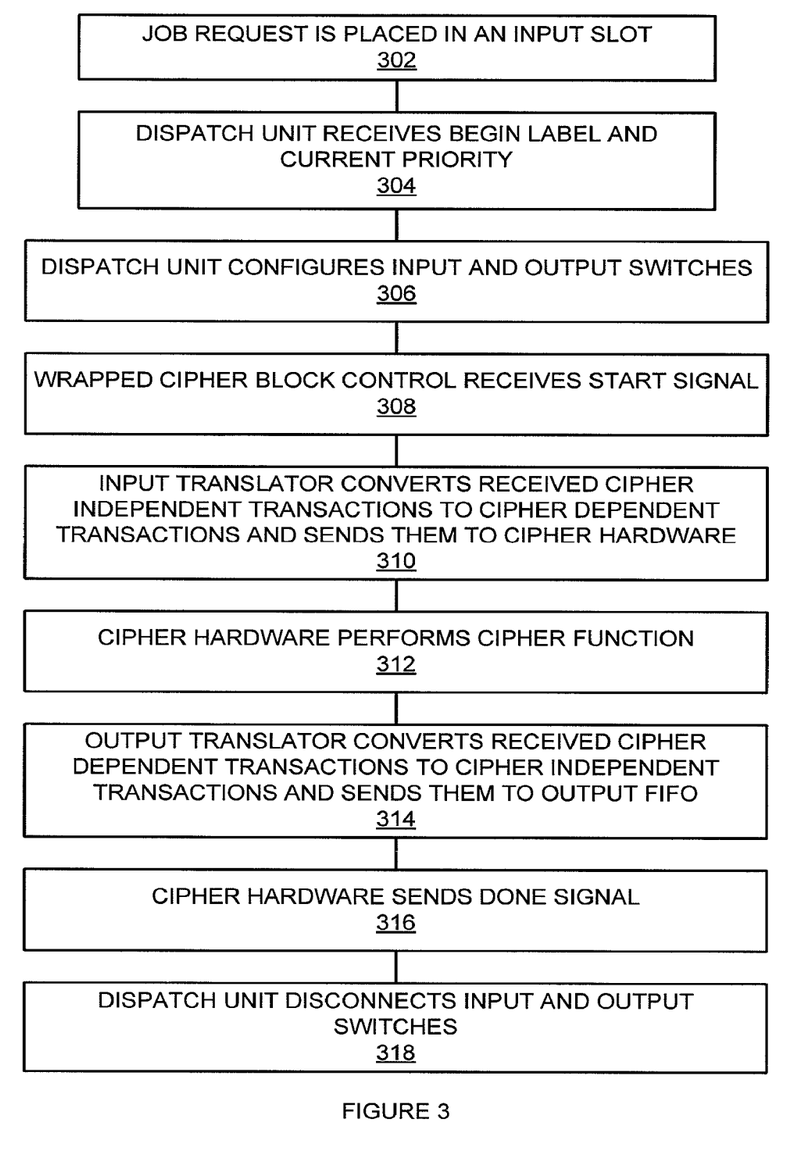
FIG. 3 is a flowchart of a method of operating a cryptographic hardware system.

FIG. 3 is a flowchart of a method of operating a cryptographic hardware system. The steps illustrated in FIG. 3 may be performed by one or more elements of cryptographic hardware 100. A job request is placed into an input slot (302). For example, a cipher independent job request may be placed into input slot 110. A dispatch unit receives a begin label and a current priority (304). For example, dispatch 120 may receive a begin signal and an indicator of priority from input slot 110.

The dispatch unit configures input and output switches (306). For example, dispatch 120 may configure input switch 115 to route cipher independent cryptographic transactions from input slot 110 to wrapped cipher block 130. Dispatch 120 may configure output switch 140 route cipher independent result transactions from wrapped cipher block 130 to output FIFO 150.

Wrapped cipher block control receives a start signal (308). For example, control 130-4 may receive a "begin" transaction which it will interpret as a start signal. An input translator converts receives cipher independent transactions to cipher dependent transactions and sends them to cipher hardware (310). For example, control 130-4 may send read requests to input slot 110. This may cause cipher independent cryptographic transactions to be sent from input slot 110 input translator 130-1. Input translator 130-1, in turn, converts the received cipher independent transactions to cipher dependent transactions. The cipher dependent transactions and/or control signals may be sent to cipher hardware 130-2.

Cipher hardware performs a cipher function (312). For example, cipher hardware 130-2 may perform a cipher function. In an example, cipher hardware may perform AES, TDES, Kasumi, SHA, RSA/ECC or another cipher function. An output translator converts received cipher dependent transactions to cipher independent transactions and sends them to an output FIFO (314). For example, output translator 130-3 may convert cipher dependent result transactions and/or control signals received from cipher hardware 130-2 to cipher independent result transactions. These cipher independent result transactions may be sent to output FIFO 150 via output switch 140.

Cipher hardware sends a done signal (316). For example, cipher hardware 130-2 may send a cipher dependent transaction or a control signal indicating it is done. The dispatch unit disconnects the input and output switches (318). For example, dispatch 120 may instruct input switch 115 to disconnect input slot 110 from wrapped cipher block 130. Dispatch 120 may also instruct output switch 140 to disconnect wrapped cipher block 130 from output FIFO 150. In an embodiment, there may be two indicators sent to dispatch 120. A first indicator would be sent when the last of the cipher independent cryptographic transactions is sent to the input translator. At that point dispatch 120 may release the input slot to receive more cipher independent cryptographic transactions. The second indicator would be sent when the last cipher independent result transactions exits the output translator.

In an embodiment, transactions related to particular Cipher/Hasher are compliant with a supported Playing Card. Mismatches cause an error. In other words, control 130-4 or 131-4 will go to an error state (ERR) and an ERROR output signal may be issued. To resume functioning from the error state, a CANCEL input signal needs to be sent. This causes cryptographic hardware 100 to do the following: (1) remove the rest of current transaction data from input FIFO in input slots 110-112; (2) send a "break/cancel" combination (e.g., ENABLE=1, VALID=0, START=1) to the wrapped cipher block 130-131. The wrapped cipher block 130-131 (1) sends ERR_END_TRANS block into an output FIFO 150-152 and issues DONE_WRITE signal; (2) sets Cipher hardware 130-2 131-2 to an initial state where it is ready to start processing new transactions; (3) changes the internal state of control 130-4 131-4 to its initial state.

Individual cipher hardware units may use very complicated I/O interface formats and timing schedules. An example of this is given in the first column of Table 3. In an embodiment, the data flow is described in terms of 64-bit blocks sent via FIFOs without a timing schedule. These may be formatted in a markup language via 8-bit control signals that contain opcodes and a few flags (e.g., last={0,1} or size={1 . . . 8}). Examples of this markup for input and output FIFOs are given in the third and fourth columns of Table 3.

TABLE 3

| Cipher Specific Interface | | |
|---|---|---|
| Timing and Format | Input FIFO Flow | Output FIFO Flow |
| @ $T_1$: send 256-bit key to port KEY | BEGIN_TRANS | BEGIN_TRANS |
| @ $T_2$ $T_1$ + 2: send 96-bit initial value to port IV | SAVE_KEY (last=0, data=key[255:192]) | RESULT (last=0, data= $out_1$[127:64]) |
| @ $T_3$ $T_2$ + 43: send the first 128-bit block of payload data to port DATA_IN | SAVE_KEY (last=0, data=key[191:128]) | RESULT (last=0, data=$out_1$[63:0]) |
| | SAVE_KEY (last=0, data=key[127:64]) | RESULT (last=0, data= $out_2$[127:64]) |
| @ $T_4$ (where $T_4 = T_3 + 2, T_3 + 4, T_3 + 6, \ldots,$ $T_3 + 40$, or at any moment after $T_3 + 42$), send the second 128-bit block of payload data to port DATA_IN | SAVE_KEY (last=1, data=key[63:0]) | RESULT (last=0, data=$out_2$[63:0]) |
| | LOAD_IV (last=0, data=iv[95:32], size=8) | ... |
| | LOAD_IV (last=1, data=iv[31:0], size=4) | RESULT (last=0, data= $out_N$[127:64]) |
| ... | ENCRYPT (last=0, data=in1[127:64]) | RESULT (last=1, data=$out_N$[63:0]) |
| @ $T_N$ (where $T_N = T_{N-1} + 2, T_{N-1} + 4, T_{N-1} + 6, \ldots, T_{N-1} + 40$, or any $T_N$ $T_{N-1} + 42$), send the last 128-bit block of payload data to port DATA_IN, and set a signal indicating that it is the last block | | HASH (last=0, data=hash[159:96], size=8) |
| | ENCRYPT (last=0, data=in1[63:0]) | HASH (last=0, data=hash[95:32], size=8) |
| | ENCRYPT (last=0, data=in2[127:64]) | HASH (last=1, data=hash[31:0], size=4) |
| | ENCRYPT (last=0, data=in2[63:0]) | END_TRANS |
| | ... | |

TABLE 3-continued

Cipher Specific Interface

| Timing and Format | Input FIFO Flow | Output FIFO Flow |
|---|---|---|
| @ T3 + 39, T4 + 39, . . . , TN + 39: read processed 128-bit blocks from port DATA_OUT<br>@ TN + 43: read 160-bit hash from port HASH_OUT | | ENCRYPT (last=0, data=inN[127:64])<br>ENCRYPT (last=1, data=inN[63:0])<br>END_TRANS |

In Table 3, BEGIN_TRANS and END_TRANS (and their error variants) are two special commands "wrapping" the transaction and defining it in general terms. These transactions may have the following arguments: (1) Id—a user-defined integer associated with particular transaction; (2) priority—a user-defined integer assigned to the transaction; (3) scenario—predefined integer defining the cipher; (4) parameters—predefined integer (or set of control bits) specifying particular mode of the cipher (e.g. encryption vs. decryption mode, must TAG be generated etc.)

In an embodiment, a cipher's input data of all types are split into 64-bit blocks. These blocks may be organized in 3 types of sections: (1) SEND_KEY sections; (2) SEND_IV sections; (3) SEND_DATA sections. Each type may be represented by 4 individual variants. These may be used when specifying, for example, master key and secondary key. For example, Example of thes variants are: (1) SEND_KEY_0 section; (2) SEND_KEY_1 section; (3) SEND_KEY_2 section; and, (4) SEND_KEY_3 section.

To encode these sections/variants, we use the 4 least significant bits of an 8-bit command bus: opcode=COMMAND [3:0] (codes for BEGIN_TRANS and END_TRANS may share the same code space). The sets of sections and the order of sections are scenario-dependent. Typically, the scenario strictly specifies both set and order of sections used. The last command in each section may be marked by a special flag as "last=1" whereas all other commands must have "last=0". The "last" bit is COMMAND[4]. The three most significant bits named "aux" (aux=COMMAND[7:5]) can be used for coding length. For example, when sending incomplete data blocks, in byte granularity, 0 means complete 8-byte data, n, where n=1, 2, . . . , 7, means n-byte incomplete data. By default, these may be the most significant bytes.

Figure 4:
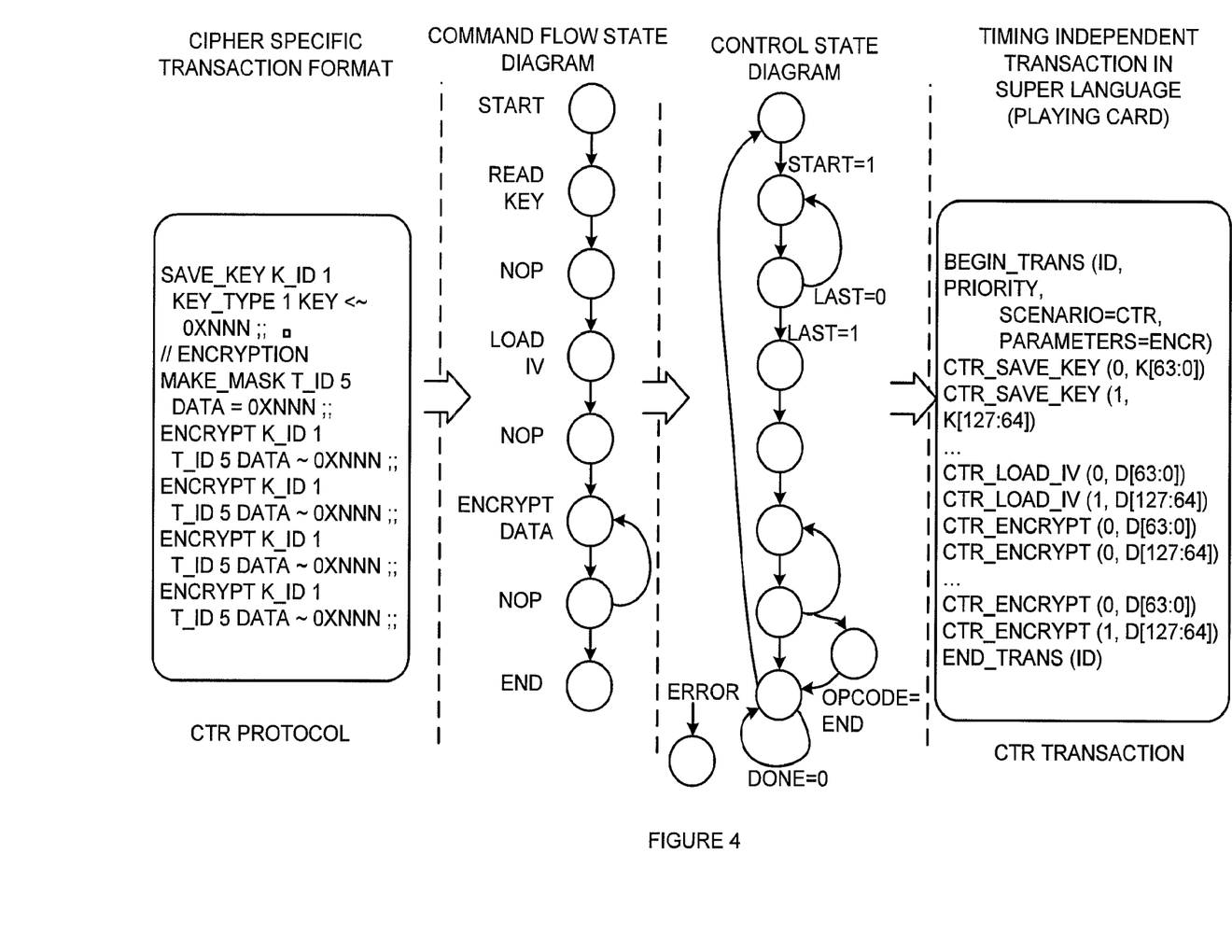
FIG. 4 is an illustration deriving a timing independent transaction in Super Language from a cipher specific transaction format and timing.

FIG. 4 is an illustration deriving a timing independent transaction in Super Language from a cipher specific transaction format and timing. In FIG. 4, a command flow state diagram is derived from cipher specific transaction format and timing. A control state diagram is derived from the command flow state diagram. Finally, a timing independent transaction in Super Language ("playing card") is derived from the flow state diagram.

Figure 5:
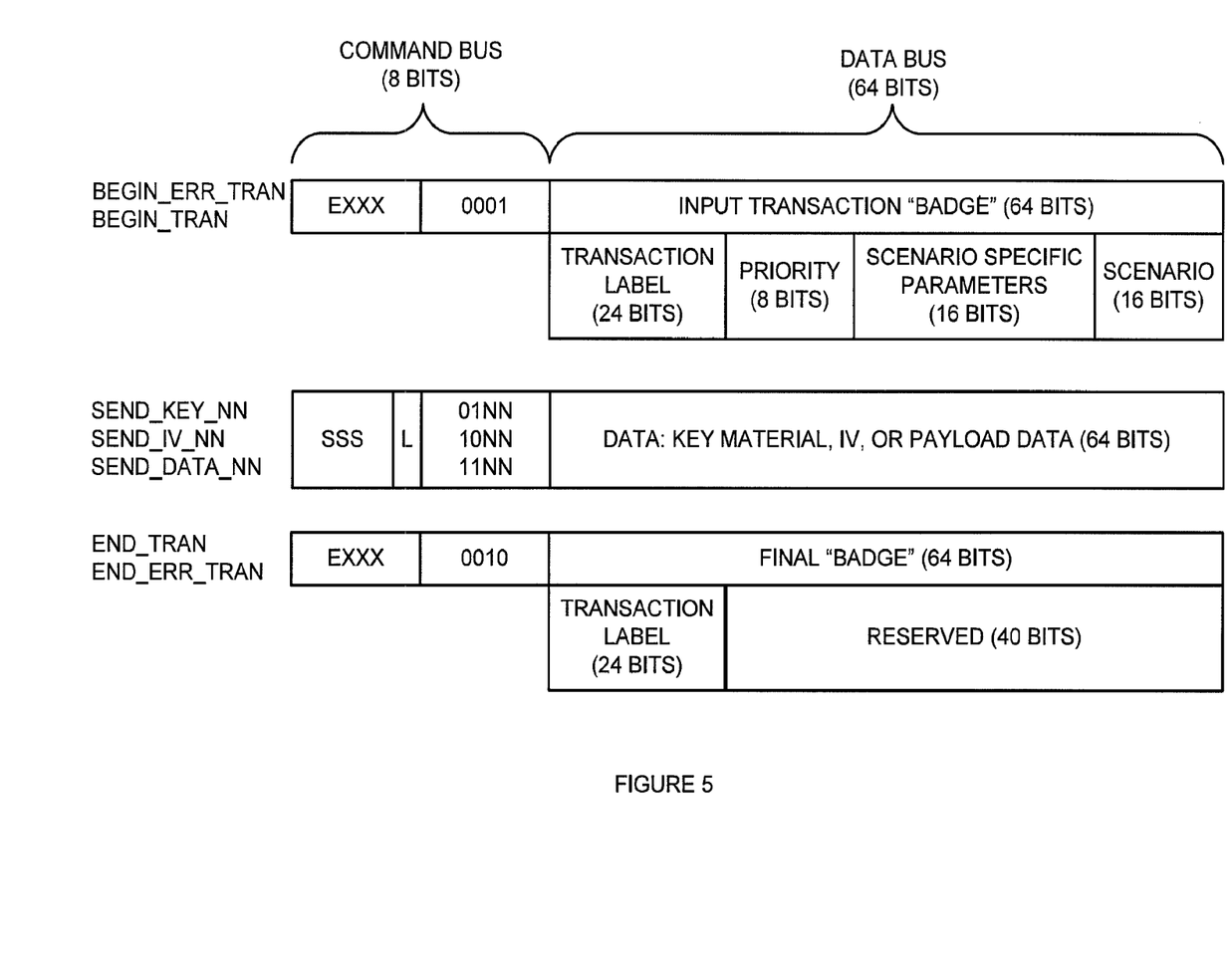
FIG. 5 illustrates an example Super Language bit level description for input FIFOs.

FIG. 5 illustrates an example Super Language bit level description for the FIFOs of input slots 110-112. In FIG. 5, for BEGIN_ERR_TRAN and BEGIN_TRAN, the three least significant bits (LSBs), denoted XXX are unused. The most significant bit, denoted E, is set to 1 for BEGIN_ERR_TRAN. The opcode for BEGIN_ERR_TRAN and BEGIN_TRAN is 0001. The opcodes for SEND_KEY_NN, SEND_IV_NN, and SEND_DATA_NN are 01NN, 10NN, and 11NN, respectively. NN denotes 0, 1, 2, or 3 in binary. Thus, for example, SEND_DATA_01 would be 1101. The L bit represents the "last" flag. SSS denotes three bits that may be used for incomplete data length encoding. The opcodes for END_TRAN, and END_ERR_TRAN is 0010. The E bit (error flag) is set to 0 for END_TRAN and 1 for END_ERR_TRAN.

Figure 6:
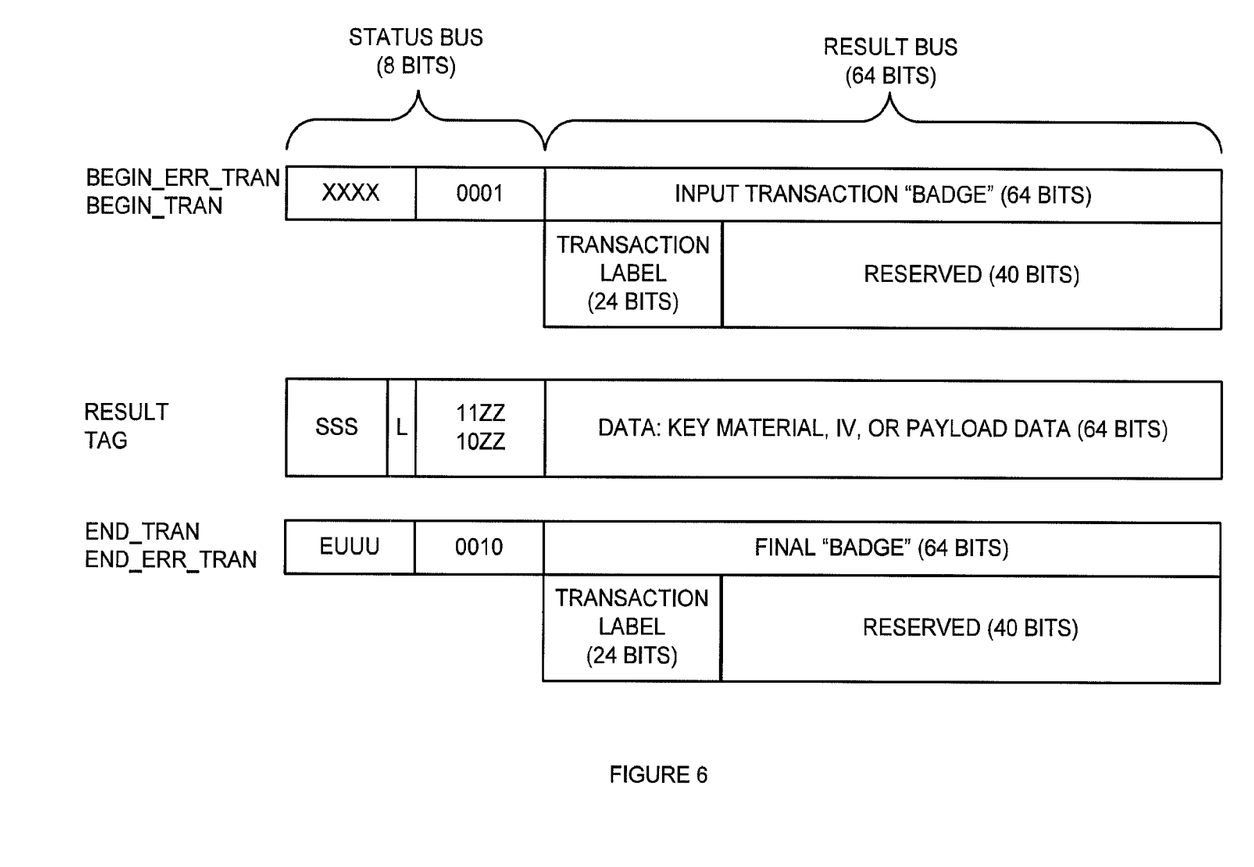
FIG. 6 illustrates an example Super Language bit level description for output FIFOs.

FIG. 6 illustrates an example Super Language bit level description for output FIFOs 150-152. In FIG. 6, for BEGIN_ERR_TRAN and BEGIN_TRAN, the three least significant bits (LSBs), denoted XXX are unused. The most significant bit, denoted E, is set to 1 for BEGIN_ERR_TRAN. The opcode for BEGIN_ERR_TRAN and BEGIN_TRAN is 0001. The opcodes for RESULT and TAG are 11ZZ and 10ZZ, respectively. ZZ denotes 0, 1, 2, or 3 in binary. Together with the first two bits of the opcode, the ZZ bits denote a block type (e.g., result, tag, hash, etc.) The L bit represents the "last" flag. SSS denotes three bits that may be used for incomplete data length encoding. The opcode for END_TRAN, and END_ERR_TRAN is 0010. The E bit (error flag) is set to 0 for END_TRAN and 1 for END_ERR_TRAN.

To further illustrate the concepts of the Super Language, Palying Cards, and the operation of cryptographic hardware 100, the following gives a sample GCM-AES transaction in three different forms: (a) in "mathematical" language, i.e. in terms of the GCM-AES standard; (b) in "native" mnemonical format of protocol for GCM-AES core; (c) in Super Language mnemonical format of the corresponding transaction for GCM-AES cryptographic functional unit (CFU). These transactions are shown in Tables 4, 5, and 6, respectively. A difference to note between (b) and (c) is that in (b), the protocol is clock accurate, and ";" indicates "new clock cycle". In other words, the first MAKE_MASK must be sent exactly 15 clock cycles after SAVE_KEY. In (c), ";" is just a separator of data blocks, and the data blocks can be pushed to/popped from FIFO-like interfaces at random clock cycles. This difference is also illustrated in FIG. 5 and Table 3.

GCM-AES cipher's example input parameters and variables are given in Table 4.

TABLE 4 operation = authenticated encryption
key length len(K) = 128 (decimal)
key K = feffe9928665731c6d6a8f9467308308 (hexadecimal)
initialization vector length len(IV) = 96 (decimal) = 60 (hexadecimal)
initialization vector IV = cafebabefacedbaddecaf888 (hexadecimal)
additional authenticated data (AAD) length len(A) = 96 (decimal) = 60 (hexadecimal)
additional authenticated data A = 0060addad2f34f7d12ef2fdd (hexadecimal)
plaintext length len(P) = 192 (decimal) = c0 (hexadecimal)
plaintext P = 09313225f88406e5a55909c5aff5000000c0b16aedf5aa0d (hexadecimal)

The same information in "native" mnemonical format organized as GCM-AES core protocol is shown in Table 5.

TABLE 5

SAVE_KEY K_ID 2 KEY_TYPE 1 KEY <~
0xfeffe9928665731c6d6a8f9467308308
;;;;;;;;;;;;;;
    MAKE_MASK K_ID 2 T_ID 4 GCM_INIT_H DATA =
0x00112233445566778899aabbccddeeff ;;;;;;;;;;;;;;;
    MAKE_MASK K_ID 2 T_ID 4 GCM_LOAD_IV DATA =
0xcafebabefacedbaddecaf88800000001 ;;;;;;;;;;;;;;;
    MAKE_MASK K_ID 2 T_ID 4 GCM_LOAD_LEN DATA ~
0x00000000000000060000000000000000c0 ;;;;;;;;;;;;;;;
    MAKE_MASK K_ID 2 T_ID 4
GCM_AAD_INCOMPLETE DATA ~
0x0060addad2f34f7d12ef2fddf7fe6eaf ;;;;;;;;;;;;;;;
    ENCRYPT K_ID 2 T_ID 4 GCM_ENC DATA ~
0x09313225f88406e5a55909c5aff50000 ;;;;;;;;;;;;;;;
    ENCRYPT K_ID 2 T_ID 4 GCM_ENC_INCOMPLETE DATA ~
0x00c0b16aedf5aa0de657ba637b39e21f ;;;;;;;;;;;;;;;
    MAKE_MASK K_ID 2 T_ID 4 GCM_TAG_FROM_REG
DATA ~
0x0060bbbbbbbbbbbbbbbbbbbbbbbbbb00c0 ;;;;;;;;;;;;;;;
;;;;;;;;;;;;;;;;;

The same information organized as GCM-AES CFU transaction, in Super Language mnemonical format is shown in Table 6.

TABLE 6

// 7e0306 (hex) is a randomly assigned transaction ID
// 17 (hex) means "it's a GCM-AES transation"
//        (codes are defined/allocated during netlist generation)
// c (hex) means "authenticated encryption"
BEGIN_TRANS ID = 0x7e0306 SCENARIO = 0x17 PARAMETERS =
0xc ;
// 128-bit key requires two 64-bit data blocks;
// the last one is marked as LAST=1
SEND_KEY_0 DATA = 0xfeffe9928665731c ;
SEND_KEY_0 DATA = 0x6d6a8f9467308308 LAST = 1 ;
// 96-bit IV also requires two 64-bit data blocks: one full block
// and one partial block (AUX=4 means "its size is 4 bytes")
// CFU/CSE ignores the padding bits (00000001),
// thus they might be randomly set
SEND_IV_0 DATA = 0xcafebabefacedbad ;
SEND_IV_0 DATA = 0xdecaf88800000001 LAST = 1 AUX = 4 ;
// opcode SEND_DATA_0 means "AAD"
// 96-bit AAD also requires two 64-bit data blocks: one full block
// and one partial block (AUX=4 means "its size is 4 bytes")
// CFU/CSE ignores the padding bits (f7fe6eaf),
// thus they might be randomly set
SEND_DATA_0 DATA = 0x0060addad2f34f7d ;
SEND_DATA_0 DATA = 0x12ef2fddf7fe6eaf LAST = 1 AUX = 4 ;
// opcode SEND_DATA_1 means "payload data"
// 192-bit payload data requires three full 64-bit data blocks
SEND_DATA_1 DATA = 0x09313225f88406e5 ;
SEND_DATA_1 DATA = 0xa55909c5aff50000 ;
SEND_DATA_1 DATA = 0x00c0b16aedf5aa0d LAST = 1 ;
// value 7e0306 (hex) must match one from BEGIN_TRANS
END_TRANS ID = 0x7e0306 ;

Table 7 gives an example playing card for GCM-AES/GMAC.

TABLE 7

Structure:
 ** Input:
    1. BEGIN_TRANS
    2. KEY SECTION
    3. IV SECTION
    4. AAD SECTION
    5. DATA SECTION
    6. END_TRANS TABLE 7-continued

** Output (for correct transactions):
    7. BEGIN_TRANS
    8. AAD-RES SECTION
    9. RESULT SECTION
    10. TAG SECTION
    11. END_TRANS
 ** Output for incorrect transactions
    12. ERR_END_TRANS
Each Super Language line defines values of:
  on input side: Command Bus (cmd[7:0]) and Data Bus (data[63:0])
  on output side: Status Bus (status[7:0]) and Result Bus (res[63:0])
==================
=== INPUT SIDE ===
==================
1. BEGIN_TRANS [1 line]
==============
cmd = 8'b00000001 // BEGIN_TRANS
data = { label[23:0], priority[7:0], prms[15:0], scenario[15:0] }
where:
    label: any value (transaction ID)
    priority: any value
    prms:
        prms[0] = 0: encryption mode
        prms[0] = 1: decryption mode
        prms[1] = 0: do not send AAD to output
        prms[1] = 1: send AAD to output
        prms[2] = 0: do not send en/decrypted payload to output
        prms[2] = 1: send en/decrypted payload to output
        prms[3] = 0: do not produce hash
        prms[3] = 1: produce hash
        prms[15:4]: ignored
    scenario: a pre-defined constant
2. KEY SECTION [2 or 4 lines]
==============
(Note: bit ordering-Bit 0 at the rigthmost position to match GCM testcases.)
    2.1. for 128-bit key
    line 1:
        cmd = 8'b00000100 // SEND_KEY_0, last=0
        data = key[127:64]
    line 2:
        cmd = 8'b00010100 // SEND_KEY_0 , last=1
        data = key[63:0]
    2.2. for 256-bit key
    line 1:
        cmd = 8'b00000100 // SEND_KEY_0, last=0
        data = key [255:192]
    line 2:
        cmd = 8'b00000100 // SEND_KEY_0, last=0
        data = key [191:128]
    line 3:
        cmd = 8'b00000100 // SEND_KEY_0, last=0
        data = key[127:64]
    line 4:
        cmd = 8'b00010100 // SEND_KEY_0, last=1
        data = key [63:0]
3. IV SECTION [2 lines]
==============
(Note: bit ordering-- bit 0 at the rightmost position to match GCM testcases.)
    line 1:
        cmd = 8'b00001000 // SEND_IV_0 , last=0, aux=0
        data = IV[95:32]
    line 2:
        cmd = 8'b10011000 // SEND_IV_0 , last=1, aux=4
        data = { IV [31:0], padding [31:0] }
    where
        IV = { Salt [31:0], InitializationVector[63:0] } // TBD
            (see RFC 4106, page 4)
        padding: any values (will be ignored)
4. AAD SECTION [variable number of lines, 0 is also possible]
==============
(Note: bit ordering--Bit 0 at the rightmost position to match GCM testcases.)
    lines 1 to (last−1):
        cmd = 8'b00001100 // SEND_DATA_0, last=0, aux=0
        data = (64 bits)
    last line (64-bit case):
        cmd = 8'b00011100 // SEND_DATA_0, last=1, aux=0
        data = (64 bits)

TABLE 7-continued

```
    last line (8 to 56 bit cases):
        cmd = { len[2:0], 5'b11100 } // SEND_DATA_0, last=1,
        aux=len
        data = (8*len bits) // len=1...7, padding TBD (recently :
                            // any values at the rightmost, i.e.
                            // least significant bits)
5. DATA SECTION [variable number of lines, 0 is also possible]
==============
(Note: bit ordering--Bit 0 at the rightmost position to match GCM
testcases.)
    lines 1 to (last−1):
        cmd = 8'b00001101 // SEND_DATA_1, last=0, aux=0
        data = (64 bits)
    last line (64-bit case):
        cmd = 8'b00011101 // SEND_DATA_1, last=1, aux=0
        data = (64 bits)
    last line (8 to 56 bit cases):
        cmd = { len[2:0], 5'b11101 } // SEND_DATA_1, last=1,
        aux=len
        data = (8*len bits) // len=1...7
6. END_TRANS [1 line]
============
cmd = 8'b00000010 // END_TRANS
data = { label[23:0], padding[39:0] }
where:
  label: the same value as in BEGIN_TRANS
  padding: any value (to be ignored)
================================================
=== OUTPUT SIDE (correct transactions) ===
================================================
7. BEGIN_TRANS [1 line]
==============
status = 8'b00000001 // BEGIN_TRANS
data = { label[23:0], padding[39:0] }
where:
    label: transaction ID, copied from input's BEGIN_TRANS
    padding: all 40 zero bits
8. AAD-RES SECTION
=================
[this section is absent if prms[1]==0, otherwise it has the
same number of lines, as in input AAD section, 0 is also possible]
(Note: bit ordering--Bit 0 at the rightmost position to match GCM
testcases.)
    lines 1 to (last−1):
        status = 8'b00001100 // RESULT_0, last=0, aux=0
        res = (64 bits)
    last line (64-bit case):
        status = 8'b00011100 // RESULT_0, last=1, aux=0
        res = (64 bits)
    last line (8 to 56 bit cases):
        status = { len[2:0], 5'b11100 } // RESULT_0, last=1, aux=len
        res = (8*len bits) // len=1...7,
                            // padding all zeroes at the rightmost, i.e.
                            // least significant bits)
9. RESULT SECTION
=================
[this section is absent if prms[2]==0, otherwise it has the
same number of lines, as in input DATA section, 0 is also possible]
(Note: bit ordering--Bit 0 at the rightmost position to match GCM
testcases.)
    lines 1 to (last−1):
        status = 8'b00001101 // RESULT_1, last=0, aux=0
        res = (64 bits)
    last line (64-bit case):
        status = 8'b00011101 // RESULT_1, last=1, aux=0
        res = (64 bits)
    last line (8 to 56 bit cases):
        status = { len[2:0], 5'b11101 } // RESULT_1, last=1, aux=len
        res = (8*len bits) // len=1...7,
                            // padding all zeroes at the rightmost, i.e.
                            // least significant bits)
10. TAG SECTION
==============
[this section is absent if prms[3]==0, otherwise it has 2 lines]
(Note: bit ordering--Bit 0 at the rightmost position to match GCM
testcases.)
    line 1:
        status = 8'b00001000 // TAG_0, last=0, aux=0
        res = TAG[127:64]
    line 2:
        status = 8'b00011000 // TAG_0, last=1, aux=0
        res = TAG[63:0]
11. END_TRANS [1 line]
=============
status = 8'b00000010 // END_TRANS
res = { label[23:0], padding[39:0] }
where:
    label: transaction ID, copied from input's BEGIN_TRANS
    padding: all 40 zero bits
================================================
=== OUTPUT SIDE (incorrect transactions) ===
================================================
Incorrect transaction starts in the same way as correct one.
But its lines may end at any moment (break inside a section
without reaching line with last=1 is also possible). The
last output line of the incorrect transaction is ERR_END_TRANS
instead of END_TRANS, where:
12. ERR_END_TRANS [1 line]
================
status = 8'b10000010 // ERR_END_TRANS
res = { label[23:0], padding[39:0] }
where:
    label: transaction ID, copied from input's BEGIN_TRANS
    padding: all 40 zero bits
================================================
=== ERROR CODES (from INTERNAL_DIAG bus) ===
================================================
0 no errors (if ABORT=0) or transaction labels mismatch
(if ABORT=1)
1 continue to wait for break combination after error detection
2 too long key (no LAST=1 in first 4 lines of key section)
4 unexpected LAST=1 in key section
6 unexpected LAST=1 in IV section
7 other protocol violations (i.e. either wrong order of sections or a
section without LAST=1)
    Error codes 2...7 will be activate only during one clock cycle, then
they will be followed by code 1.
```

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A cryptographic hardware system, comprising:
a plurality of input slots that receive cipher independent cryptographic transactions;
a first wrapped cipher block that includes first translation hardware that receives cipher independent cryptographic transactions and sends first cipher dependent transactions to first cipher hardware, said first translation hardware translating said cipher independent cryptographic transactions to said first cipher dependent transactions and translates first cipher dependent result transactions received from said first cipher hardware to cipher independent result transactions, said first translation hardware not encrypting and not decrypting information received in said cipher independent cryptographic transactions, said cipher independent cryptographic transactions unsuitable for processing by said first cipher hardware, the first translation hardware outputting, to said first cipher hardware, first cipher dependent transactions having at least one of a first bit ordering, and a first command sequence that are different from the cipher independent cryptographic transactions; and, a first output First In First Out (FIFO) having a plurality of slots that receive said cipher independent result transactions associated with said first wrapped cipher block;

further comprising: a second wrapped cipher block that includes second-translation hardware that receives cipher independent cryptographic transactions and sends second cipher dependent transactions to said second cipher hardware, said second translation hardware translating said cipher independent cryptographic transactions to said second cipher dependent transactions and translates second cipher dependent result transactions received from said second cipher hardware to cipher independent result transactions, said second translation hardware not encrypting and not decrypting information received in said cipher independent cryptographic transactions, said cipher independent cryptographic transactions unsuitable for processing by said second cipher hardware, the second translation hardware outputting, to said second cipher hardware, said second cipher dependent transactions having at least one of a second bit ordering and a second command sequence that are different from said first cipher dependent transactions;

wherein said wrapped cipher block sends said first cipher dependent transactions to said first cipher hardware using cipher dependent timing.

2. The system of claim 1, further comprising:

an input switch that receives cipher independent cryptographic transactions and sends cipher independent cryptographic transactions to said first wrapped cipher block and said second wrapped cipher block.

3. The system of claim 2, further comprising:

an output switch that receives cipher independent result transactions from first wrapped cipher block sends cipher independent result transactions associated with said first wrapped cipher block to said first output FIFO and sends cipher independent result transactions associated with said second wrapped cipher block to a second output FIFO.

4. The system of claim 3, further comprising:

a dispatch unit that controls said input switch and said output switch.

5. The system of claim 4, wherein said dispatch unit controls said input switch, said output switch, said first wrapped cipher block, and said second wrapped cipher block such that said first cipher hardware and said second cipher hardware perform cryptographic functions in parallel.

6. The system of claim 1, wherein said first cipher hardware and said second cipher hardware implement a first cipher.

7. The system of claim 1, wherein said first cipher hardware implements a first cipher and said second cipher hardware implements a second cipher.

8. A method of providing cryptographic services, comprising:

receiving cipher independent cryptographic transactions;

receiving said cipher independent cryptographic transactions into a first wrapped cipher block that includes first translation hardware and first cipher hardware;

translating, by said first translation hardware, said cipher independent cryptographic transactions to first cipher dependent transactions, said first translation hardware not encrypting and not decrypting information received in said cipher independent cryptographic transactions, said cipher independent cryptographic transactions unsuitable for processing by said first cipher hardware, the first translation hardware outputting, to said first cipher hardware, said first cipher dependent transactions having at least one of a first bit ordering and a first command sequence that are different from the cipher independent cryptographic transactions;

sending first cipher dependent transactions to said first cipher hardware; translating first cipher dependent result transactions received from said first cipher hardware to cipher independent result transactions; and, receiving said cipher independent result transactions into a first output First In First Out (FIFO);

further comprising: receiving cipher independent cryptographic transactions into a second wrapped cipher block that includes second translation hardware and second cipher hardware;

translating, by said second translation hardware, said cipher independent cryptographic transactions to second cipher dependent transactions, said cipher independent cryptographic transactions unsuitable for processing by said second cipher hardware, the second translation hardware outputting, to said second cipher hardware, said second cipher dependent transactions having at least one of a second bit ordering and a second command sequence that are different from the first cipher dependent transactions;

sending second cipher dependent transactions to said second cipher hardware; and, translating second cipher dependent result transactions received from said second cipher hardware to cipher independent result transactions;

wherein said first cipher hardware and said second cipher hardware having different timing requirements.

9. The method of claim 8, wherein said step of sending first cipher dependent transactions sends said first cipher dependent transactions to said first cipher hardware using cipher dependent timing.

10. The method of claim 8, wherein said first cipher hardware and said second cipher hardware perform cryptographic functions in parallel.

11. The method of claim 8, wherein said cipher independent cryptographic transactions are specified without timing information.

12. The method of claim 8, wherein said first cipher hardware and said second cipher hardware implement a first cipher.

13. The method of claim 8, wherein said first cipher hardware implements a first cipher and said second cipher hardware implements a second cipher.

* * * * *